United States Patent

Feldman

[15] 3,653,261
[45] Apr. 4, 1972

[54] PRESSURE DEMAND METER FOR FLUID FLOW MEASUREMENT

[72] Inventor: Stephen L. Feldman, Baltimore, Md.

[73] Assignee: Richard Ruben, Arlington, Va. a part interest

[22] Filed: Mar. 6, 1970

[21] Appl. No.: 17,073

[52] U.S. Cl.................................................73/233, 73/198
[51] Int. Cl.........................................................G01f 1/02
[58] Field of Search.....................73/198, 230, 233, 199, 194

[56] References Cited

UNITED STATES PATENTS

| 3,053,082 | 9/1962 | Loud et al................................ | 73/198 |
| 1,185,736 | 6/1916 | Trood...................................... | 73/230 |
| 1,881,572 | 10/1932 | Herz........................................ | 73/233 |

FOREIGN PATENTS OR APPLICATIONS

| 16,568 | 12/1884 | Great Britain............................ | 73/230 |

Primary Examiner—Richard C. Queisser
Assistant Examiner—John P. Beauchamp
Attorney—Le Blanc & Shur

[57] ABSTRACT

The meter includes a quantity meter, pressure measuring device and a register. The outputs of the pressure measuring device and quantity meter are correlated to provide a numerical readout at the register inversely proportional to the pressure of the fluid in the fluid line and directly proportional to the quantity of flow whereby demand on the fluid system is reflected in the quantity readout.

16 Claims, 9 Drawing Figures

INVENTOR
STEPHEN L. FELDMAN

BY Le Blanc & Shur

ATTORNEYS

PRESSURE DEMAND METER FOR FLUID FLOW MEASUREMENT

The present invention relates to methods and apparatus including a metering device for measuring fluid flow and particularly relates to methods and apparatus for reflecting overall demand on a water distribution system in a readout of the actual volume or quantity of water passing through a given portion of the system in a given time period. Particularly, the present invention provides methods and apparatus for correlating a characteristic of water flow in a specified water line, which is a function of the rate of flow, with the pressure of the system thereby to register an output reflecting demand on the system and volume of water flowing past the metering device in the specified line.

Conventional water distribution systems are constructed with a capacity to meet peak loads on the system at any given time. That is to say, a water distribution system must be constructed to provide water to consumers at all times even when the demands on the water system are the greatest. As can be illustrated, peak demand loads on water systems are seasonal and periodically occur at near predictable and stochastic times within the peak demand season. For example, summertime is a peak demand season wherein water usage is heavy and above an annual average. This is caused by, among other things, summer sprinkling of lawns, filling of swimming pools, fire hydrant use, etc. Also, it can be demonstrated that the average summertime peak demand is significantly below the peak demand for a particular day as water usage is customarily extremely high and peaks during specified hours of the day, for example, in some areas between 5:00–8:00 p.m. at which time the suburban water consumer customarily sprinkles the lawn. It has been demonstrated that peak summertime demand periods approach anywhere from about three to seventeen times the average demand on the water system during the wintertime. As a result of this customary pattern of water usage, conventional water systems must be and are constructed to provide water during these peak demand periods to meet the demands of the consumers. In other words, a conventional water system has large excess capacity under average demand conditions and particularly during the winter season where water usage is low.

As is conventional, a water system user is provided with a water meter which measures the quantity of water actually utilized by that consumer. For example, the suburban home owner, as well as others, is normally provided a quantity or rate of flow meter whereby his total water usage can be totalized in a given time period. To calculate the charge to a consumer for utilizing water from the system, water suppliers usually employ a declining block rate pricing structure. That is to say, the cost is in an inversely stepped proportion to the quantity utilized. Accordingly, the marginal cost of water to a low water utilizer is greater than the marginal cost which accrues to a high water utilizer. It is thus hypothesized that relatively low quantity water users are, in effect, subsidizing a portion of the cost of the water utilized by the high volume water users under this discriminatory pricing structure. By employing quantity or rate of flow meters which provide readouts solely in terms of quantity utilized as is the current practice and providing a price structure based solely on quantity of water utilized, the high water consumer is not charged his proportional share of the cost of the system which equitably would be in proportion to the extent to which the water system must be ready to provide water to him.

In accordance with the present invention, a novel and unique water flow measuring device is utilized having an output which is a function of both the overall demand on the water system and the total volume of water utilized in a specified portion of the system or by the particular user. The present pressure demand water meter utilizes the pressure of the system as an indicator of water usage and correlates it with the volume of water actually utilized by a consumer to register demand-quantity units directly proportional to the volume of water utilized and inversely proportional to the system pressure. With a price structure based on quantity, the present invention provides a method and apparatus wherein the cost to the consumer may be directly correlated to the demand on the system at the time of his use. For example, should a water user utilize the water system at a time when system demand is high, the measuring device of the present invention will register, in quantity units, a value directly proportional to the quantity actually utilized and the system demand which value would be higher than if the same quantity of water was utilized during some intermediate or low demand period. The increased quantity units registered for water use at peak or high demand periods will thus cause an increase in the consumers marginal cost (assuming cost is a direct function of quantity utilized) in comparison with the marginal cost for the same quantity of water during a low demand period. The cost to the consumer is thus directly related to system demand and he will bear directly the added cost of his demand during peak or high system demand periods resulting in a more equitable distribution of costs.

Further to the present invention, the measuring device hereof includes an indicator for the water consumer which will inform him of the demand placed on the system by other users thereof at any given time. Thus, the user can be provided, prior to utilizing any water, an indication of his marginal cost should he utilize the water system at that time. That is to say, during peak demand periods, the system pressure will be lower and this is indicated to a potential consumer at his water meter or at a convenient location by means of a remote meter. Thus, the potential consumer is informed, assuming for example an indication of peak or high system demand, that the quantity units registered and hence marginal cost of water to him if he utilizes water at that time will be greater than the respective quantity units registered and hence marginal cost of water utilized if he were to consume a like quantity of water during a period other than a peak or high system demand period. Conversely, the potential consumer is also informed when system demand is low as a relative high system pressure will be indicated, and the consumer can thereby utilize water at a lower marginal cost. Moreover, a consumer, by adjusting his pattern of water usage to correspond to periods of low system demand, can decrease his average marginal cost and likewise peak demand loads on the system.

By employing the measuring device hereof, and thus educating water consumers to the fact that their marginal costs will increase during peak or high demand periods and that lower costs can be obtained by utilizing the same quantity of water during low demand periods, the total water system capacity need not be as great as otherwise would be necessary. Translated into practical terms, the time horizon for existing water systems can be extended as peak demand periods will be damped out, resulting, among other benefits, in postponement of periodic searches for new sources of water. Also, further water systems need not be constructed in accordance with conventional peak demand periods, but can be constructed to a much less capacity while servicing the same needs.

A further feature of the present invention resides in the provision of a meter attachment wherein the attachment can be employed with existing water meters through the provision of mechanisms for changing the output of the volume meter, for example, changing the gear ratio in a standard positive displacement type quantity meter.

Accordingly, it is a primary object of the present invention to provide a novel demand measuring device for fluid systems.

It is another object of the present invention to provide a metering device for measuring pressure and demand characteristics of water flow in a water distribution system.

It is another object of the present invention to provide a pressure-demand meter for measuring the quantity of flow in a fluid line and the pressure of the fluid in the line and correlating the two measurements to register units directly proportional to the quantity of flow in the fluid line and inversely proportional to the pressure in the system.

It is a further object of the present invention to provide a remote indication of demand on the fluid system to a potential consumer of the system.

It is a further object of the present invention to provide an improved demand meter for measuring quantity and demand characteristics of water flow in a water distribution system and which can be formed as an integral one piece unit or as an attachment to and a modification of a conventional quantity measuring water meter.

It is a related object of the present invention to provide methods and apparatus for determining user charges in a water distribution system reflecting overall demand on the system and quantity of water utilized and having the effects of leveling peak demands.

These and further objects and advantages of the present invention will become more apparent upon reference to the following specification, appended claims and drawings, wherein:

Figure 1:
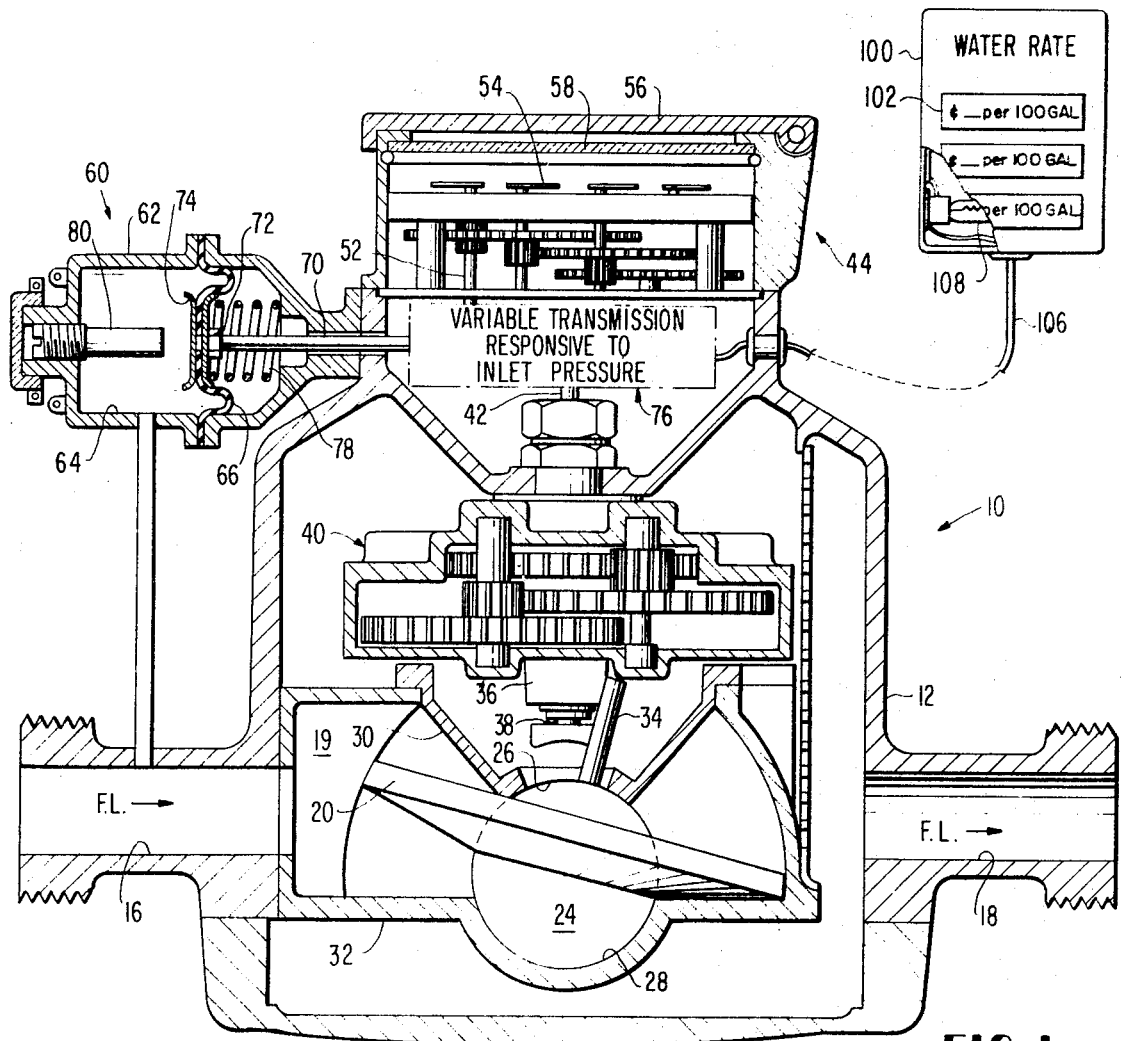
FIG. 1 is a vertical cross sectional view of a measuring device constructed in accordance with the present invention.

Referring now to the drawings, particularly to FIG. 1, there is illustrated a pressure-demand measuring device constructed in accordance with the present invention and generally indicated at 10. The measuring device hereof includes portions of a conventional positive displacement type meter 12 for measuring the quantity of flow through a fluid line indicated F.L., it being appreciated that other types of metering devices for measuring flow rate or quantity of flow can be employed. For example, the quantity of fluid flow through line F.L. may be measured by a conventional rate of flow volume meter utilizing the differential pressure created when a restriction is placed in the flow line to provide a difference in pressure and hence a determination of the velocity of flow. The quantity of flow in this type of meter can be calculated as flow velocity and area of the restriction are known factors.

The portion of a conventional quantity meter herein illustrated is of the nutating disc type. In this meter, there is provided a casing 14 having an inlet port 16 and an outlet port 18 and a generally cylindrical measuring chamber 19 there between housing a wobble disc 20. The disc preferably includes a radial partition 22 and a central sphere or ball 24. Sphere 24 is pivotally mounted between spherical seats 26 and 28 formed in intermediate and lower wall portions 30 and 32 respectively of casing 14. Ball or sphere 24 includes an eccentrically mounted drive pin 34 bearing against an inverted frusto-conical bevel gear 36 mounted on a shaft 38 extending axially of the meter. It will be appreciated that as water flows through the measuring chamber 19, disc 20 nutates and drives shaft 38 through the friction coupling between the bevel gear and the drive pin 34.

Figure 2:
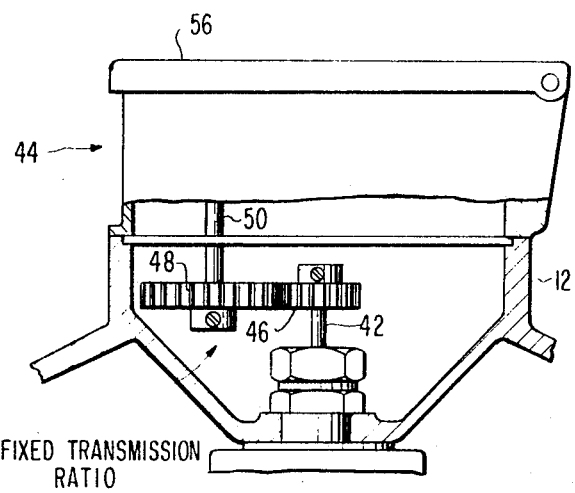
FIG. 2 is a fragmentary vertical cross sectional view of the transmission of a conventional positive displacement type meter.

Referring now to FIGS. 1 and 2, output shaft 38, which is proportional to the quantity of fluid flowing through fluid line F.L., drives an intermediate gear train, generally indicated at 40, having an output shaft 42. Gear train 40 is a conventional gear reduction whereby the rotation of shaft 38 is geared down to a rotational speed compatible with the gearing of a register, generally indicated at 44. As illustrated in FIG. 2, the output shaft 42, in a conventional positive displacement type meter, is geared via gears 46, 48 and a shaft 50 to the gear train of register 44, the gear train being schematically illustrated in FIG. 1 at 52. It will be appreciated that the conventional quantity register includes a plurality of dials indicated at 54 to indicate the quantity of flow through the fluid line in cubic feet or gallons or some other standard unit of measurement. Obviously, other types of visual readouts could be provided, for example, a combined numerical counter and dial indicating hand as desired. The conventional register 44 is suitably secured at the top of casing 12 and includes a pivotable lid 56 for protecting the glass dial face 58 and the gearing of register 44, the register also being removable from casing 12.

In accordance with the present invention, a measuring device, generally indicated at 60, is provided for measuring the pressure in fluid line F.L. As noted previously, the pressure in the fluid line provides an indication of the total demand on the overall water distribution system. That is to say, when system demand is high, the pressure in the system will be low. Conversely, when the system demand is low, the pressure in the line will be relatively higher. To provide this indication of system demand, pressure measuring device 60 comprises a casing 62 having a chamber 64 divided by a diaphragm 66. A pressure tap is connected to the fluid line in communication with one side of diaphragm 66 in chamber 64. One end of a shaft 70 is suitably secured to a central portion of diaphragm 66 by means of a nut 72 and a pair of washers 74 on opposite sides of diaphragm 66. Shaft 70 extends from diaphragm 66 through openings in casings 62 and 12 and provides an input to a variable transmission drive generally indicated 76 in FIG. 1 and hereinafter described. A spring 78 locates diaphragm 66 and hence shaft 70 in a predetermined axial position. An adjustable screw 80 threads through the opposite end of casing 62 to facilitate adjustment of the position of the diaphragm 66 as desired.

Figure 3:
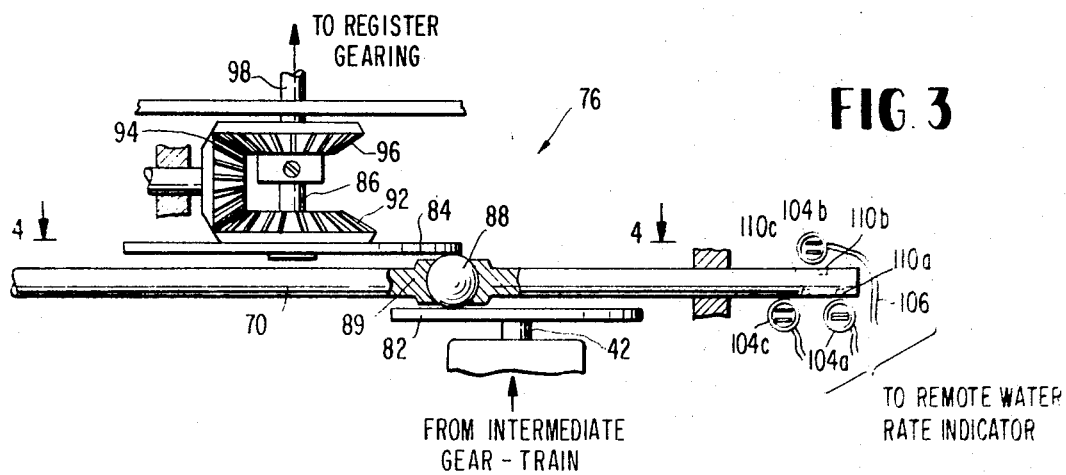
FIG. 3 is an enlarged fragmentary vertical cross sectional view of a variable transmission employed with the measuring device of the present invention.
Figure 6:
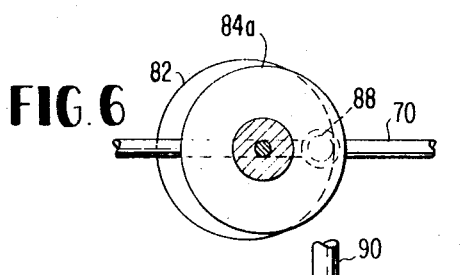
FIG. 6 is a cross sectional view thereof taken generally about on line 6—6 in FIG. 5.
Figure 4:
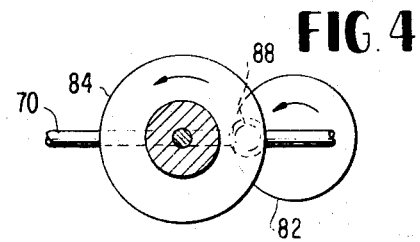
FIG. 4 is a cross sectional view taken about on line 4—4 in FIG. 3.

Turning now to FIG. 3, the variable transmission drive, which is interposed between output shaft 32 of the quantity measuring device 12 and register 44, is for the purpose of correlating demand on i.e., pressure in the system with the quantity measurement to provide an output in demand-quantity units directly proportional to the quantity of flow through the users fluid line and inversely proportional to the demand on the overall system. To this end, the variable transmission drive 76 includes a disc 82, preferably plastic, carried by output shaft 42 from the intermediate gear train 40. A second disc 84 is carried for rotation about an axis laterally offset from the axis of shaft 42 on a shaft 86, disc 84 being pivotally carried by shaft 86. Disc 84 also lies on the opposite side of shaft 70 from disc 82 and in a spaced parallel relation thereto. Shaft 70 carries a freely rotatable ball 88 in a socket 89, which ball 88 engages the discs 82 and 84 at diametrically opposed positions. Particularly, the ball 88 and the discs 82 and 84 are disposed such that, in the position illustrated, the point of engagement between ball 88 and disc 82 lies about medially of a radius of disc 82 while the point of engagement of ball 88 with disc 84 lies at the extreme radial position of disc 84. As will be appreciated, rotation of disc 82 rotates ball 88 which, in turn, rotates disc 84 in a like direction as disc 82. To provide a direction of rotation of the input shaft 90 to the register 44 compatible with the existing direction of rotation of the input shafts on conventional quantity meters, the rotation of disc 84 is reversed through suitable bevel gearing 92, 94 and 96 to drive output shaft 90 in a direction opposite to the direction of rotation of shaft 42. Specifically, gear 92 is secured to disc 84 and drives right angle bevel gear 94 which, in turn, drives gear 96 which is fixed to shaft 90.

The variable transmission 76 provides a continuous correlation between the quantity measured and the pressure or demand in the water system. The shaft 70 in FIG. 3 is illustrated at the extreme end of its movement to the right. This corresponds to a sensing of peak pressure in the fluid line F.L. and hence this axial position of shaft 70 indicates low demand on the water system. When the demand on the system increases with a concomitant reduction in pressure in the fluid line, the pressure responsive diaphragm 66 will move to the left, in FIG. 1, under the bias of spring 78 to axially displace shaft 70 to the left as seen in FIG. 3. As ball 88 increases its radial extent along disc 82 and shortens its radial extent along disc 84, it will be appreciated that the speed of rotation of disc 84 and hence output shaft 90 will increase. Since output shaft 90 is coupled to gear box 52 of register 44, the rate of movement of the dials on register 44 will be increased proportionally as the pressure in the fluid system decreases reflecting increased demand on the system. Thus, register 44 will record quantity-demand units in direct proportion to the quantity of water utilized and inversely proportional to the demand on the system. Hence, a water consumer utilizing water during peak demand periods will incur a greater marginal water cost (assuming a cost based on quantity of water utilized) than the marginal water cost for the same quantity of water if utilized during lower demand periods.

It is a particular feature of the present invention that the demand on the water system is indicated to the water consumer prior to his use at a remote meter, for example a meter located at a water faucet through which the bulk of the water utilized by the consumer flows. Referring now to FIGS. 1 and 3, the remote meter is generally indicated 100 and included a display face 102 calibrated to indicate to the consumer an indicia of his marginal cost for utilizing water at a particular time period. For example, it is possible to calibrate the remote meter display in a plurality of variable costs per increment of water utilized, i.e., a scale of stepped costs per increment of water utilized which, in effect, is a proportional indication of demand on the system. Obviously, other types of calibrations for the remote meter could be utilized. For example, a dial indicator pointing to various indications of demand, i.e., high, intermediate or low demand could be employed. To accomplish this remote demand indication whereby the potential water consumer is informed of the system demand and hence an indication of his comparative marginal cost prior to utilization of any water, there is provided in the variable transmission 76 a plurality of reed switches indicated at 104a–104c. The electrical lines 106 for the switches 104 extend through an opening in casing 12 for connection with the remote indicator 100. Suitable electric circuitry as well as a connection for a source of power is provided within meter 100 whereby lamps 108, disposed behind the demand indicator display elements 102, can be selectively illuminated in accordance with the demand on the system. As illustrated in FIG. 3, a plurality of magnets 110 are disposed on shaft 70 at axially spaced positions therealong and, in the illustrated form with shaft 70 lying in its extreme axial position, magnet 110a is disposed in relation to reed switch 104a to close the latter and thereby complete an electrical circuit to and light the lamp 108 associated with the display element 102 indicating low system demand, i.e., high pressure in the system. Thus, when such display element is illuminated, a low marginal water cost is indicated to the potential consumer. As the pressure in the system decreases in response to increasing system demands, shaft 70 is displaced axially to the left in FIG. 3 to locate magnet 110b in actuating relation to reed switch 104b whereby switch 104b is closed lighting the corresponding lamp 108 in remote meter and illuminating the corresponding display element to indicate a certain intermediate demand on the water system and a relative marginal cost to the consumer. Obviously, the displacement of shaft 70 to the left locates magnet 110a in a position such that reed switch 104a will open. Further axial displacement of shaft 70 to the left as seen in FIG. 3 in response to increased demands on the system and hence lower system pressure, alines magnet 110c with reed switch 104 to close the latter whereby the associated display element 102 is illuminated indicating an even higher marginal cost to the water consumer should he utilize water at that time. Obviously, the displacement of shaft 70 to the left locates magnet 110a in a position such that reed switch 104a will open. Further axial displacement of shaft 70 to the left as seen in FIG. 3 in response to increased demands on the system and hence lower system pressure, alines magnet 110c with reed switch 104 to close the latter whereby the associated display element 102 is illuminated indicating an even higher marginal cost to the water consumer should he utilize water at that time. Obviously, the demand or marginal cost indication could be provided on the metering device 12 and need not be a remote type meter.

Figure 5:
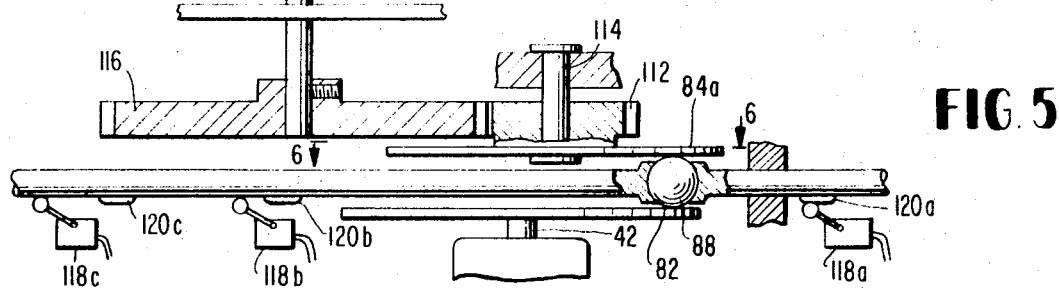
FIG. 5 is an enlarged vertical cross sectional view of another form of variable transmission for use with the measuring device hereof.

The embodiment in FIG. 3 provides a significant change in the quantity-demand output of register 44 in response to incremental movement of shaft 70. The variable transmission device illustrated in FIG. 5 provides a smaller incremental change in the quantity-demand readout at register 44 for similar movement of shaft 70. To accomplish this, disc 84a lies on an axis close to, but offset from the axis of shaft 42 and the distances between the axes of the discs 82 and 84a to the points of engagement with ball 88 i.e., their respective effective radiuses, are slightly unequal. Thus, the change in the speed of rotation of disc 84a as compared with the speed of rotation of disc 82 for a given increment of axial movement of shaft 70 is relatively smaller than the changes effected in the embodiment illustrated in FIG. 3 for a like increment of movement of shaft 70. Also, to provide compatibility with conventional registers, the disc 84a is coupled to the output shaft 90 (which in turn is coupled to the gear box of the register 44) through a gear 112 mounted on shaft 114, gear 112 meshing with a gear 116 carried on shaft 90.

Also, microswitches can be employed to operate the remote meter 100 from the variable transmission drive illustrated in FIG. 5. To this end, switches 118 are located at axial spaced positions along shaft 70 and shaft 70 is provided with switch actuating elements 120 which engage against the switch actuating arms of switches 118. As in the previous embodiment, the shaft 70 is illustrated in its furthermost position to the right with the switch 118a being closed to actuate its corresponding lamp in remote meter 110. Axial movement of shaft 70 to the left as seen in FIG. 5 in response to increasing water system demand will actuate switches 118b and 118c in succession to light the associated lamps and hence the corresponding display elements 102 in meter 100.

Figure 7:
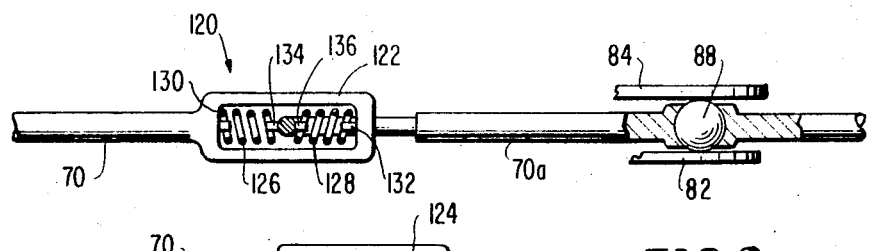
FIG. 7 is a fragmentary side elevational view with parts broken out and in cross section for ease of illustration of a lost motion linkage for use with the measuring device hereof.
Figure 8:
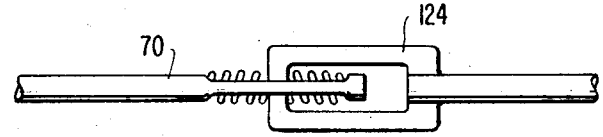
FIG. 8 is a top view of the linkage illustrated in FIG. 7.

Referring to FIGS. 7 and 8, a lost motion device, generally indicated at 120, can be inserted in the variable transmission drive 76 to prevent excessive wear of the disc surfaces in frictional engagement with the sphere 88. To this end, the end of the input shaft 70 from pressure gage 60 is formed to provide a link 122. An axially alined shaft 70a includes a link 124 which is received within link 122. A pair of springs 126 and 128 extend between opposite ends of link 122 and the cross member of link 124. Also, stops 130 and 132 are provided at opposite ends of link 122 and stops 134 and 136 are provided on opposite sides of the cross member of link 124. Shaft 70a mounts ball 88 for engagement between the discs 82 and 84 in the manner previously described. Accordingly, as long as there is no flow in fluid line F.L., sphere 88 remains in the same position regardless of fluctuations in the pressure measurement, i.e., axial movement of shaft 70. As soon as flow is provided in the fluid line F.L. and disc 20 begin to rotate, the movement of sphere 88 permits it to be drawn into its proper radial position virtually instantaneously as if no lost motion device was interposed between the ball 88 and shaft 70.

Figure 9:
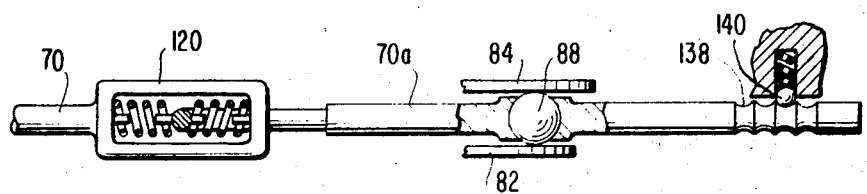
FIG. 9 is a fragmentary enlarged side elevational view with parts broken out and in cross section of a further form of the present invention.

Referring now to the embodiment hereof illustrated in FIG. 9, there is provided a similar lost motion device 120 for moving ball 88 into various radial positions along discs 82 and 84 as previously described in order to effect quantity-demand readouts on register 44 proportional to the quantity of flow and demand in the system wherein, rather than a continuous reading reflecting quantity and demand, there is provided a stepped reading reflecting quantity and different levels in demand. To accomplish this, shaft 70a is provided with a series of axially spaced grooves 138. The end of shaft 70a including grooves 138 is received within an opening in the meter housing having a spring biased ball detent 140. Accordingly, when shaft 70 is shifted axially to a position wherein the spring force in the lost motion coupling 120 overcomes the spring force on the ball detent 140, shaft 70a will shift axially into a predetermined detented position wherein ball 88 will be maintained at a predetermined position between discs 82 and 84 despite slight fluctuations in pressure or demand which are taken up by the lost motion device. The position of ball 88 relative to discs 82 and 84 is thus determined by the axial movement of shaft 70 as in the previous embodiments, but with the result that ball 88 is axially stepped into different radial positions relative to discs 82 and 84 rather than continuously moved as in the previous embodiments.

As previously stated, water system demand is a function of the pressure of the fluid in the system. The system pressure can be measured in any specified branch conduit and is a function of: the relative elevation of the supply in the specified conduit, i.e., the head; the length of the pipe between the water supply source and the point of measurement in the specified conduit, whether the source is a reservoir or a pumping station; the pipe diameter; the friction losses obtained in the flow of water through the pipe; the velocity of the flow through the pipe; as well as other accountable factors. Accordingly, it will be appreciated that variations in pressure will be observed in various conduits depending upon the foregoing factors. The factors are determinable and the pressure reading in a specified conduit is compensated to account for such factors by, for example, initially setting the pressure measuring device in accordance with such factors to provide the appropriate input to the register for the demand measurement in a specified conduit. Thus the pressure measurement reflects demand directly.

As a result of the present invention, it has been found possible to provide a readout at the register 44 in quantity units, i.e., gallons or cubic feet or some other standard of quantity measurement which reflects, in addition to the quantity of water utilized the system demand at the time of measurement. Water consumer charges can therefore be based on the quantity display at the register as a cost per increment of water utilized. By this method of calculating user charges, the cost of the water is proportional quantity utilized and system demand.

It will be appreciated that the measuring device hereof is applicable to industrial, public and commercial users of a water system as well as individual home users. Moreover, it will be further appreciated that the apparatus and methods hereof are applicable to other fluid flow systems where quantity-demand readouts are desirable.

It will be appreciated that the objects of the present invention are fully accomplished by the foregoing measuring device in that there has been provided a quantity-demand readout on a flow register reflecting the quantity of flow through a fluid line and the system demand wherein the quantity-demand readout is directly proportional to the quantity of flow through the line and inversely proportional to the demand on the system. Moreover, there has been provided a remote indication to the potential water consumer of the demand on the system at any particular time whereby he has knowledge of the incremental cost of the water should he choose to consume water at that time. Additionally, the present measuring device may be provided as both an attachment for existing quantity flow meters or may be comprised of an intregal quantity demand type meter as desired.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A fluid measuring device comprising: sensing means for measuring a characteristic of fluid flow in a fluid line and providing an output signal in response thereto proportional to the rate of flow of fluid through the fluid line, means for sensing the pressure of the fluid and providing an output signal proportional to such pressure, a register and means for processing said rate of flow signal and said pressure signal to provide an indication at said register proportional to the rate of flow of fluid through the fluid line and inversely proportional to the pressure of the fluid.

2. The device according to claim 1 wherein said register includes a display registering quantity units, the increase in quantity units registered and displayed for a given increment of actual fluid flow at a first fluid pressure being greater than the increase in quantity units registered and displayed for a like quantity of fluid flow at a second fluid pressure higher than said first fluid pressure.

3. The device according to claim 1 wherein said register includes a display registering quantity units, the increase in quantity units registered for a given pressure at a first rate of fluid flow being greater than the increase in quantity units registered for the given pressure at a second rate of fluid flow less than said first rate of fluid flow.

4. The device according to claim 1 wherein said processing means includes means for continuously correlating said rate of flow signal and said pressure signal to provide an indication at said register continuously proportional to the rate of flow of fluid through the line and continuously inversely proportional to the pressure of the fluid in the line.

5. The device according to claim 1 wherein said processing means includes means for converting said rate of flow signal to a quantity output signal for said register proportional to the rate of flow through the line, means coupled to said output pressure signal for altering said converting means in accordance with said pressure signal to provide a quantity output signal at said register in a different proportion to the rate of flow through the line than said latter mentioned proportion.

6. The device according to claim 1 wherein said processing means includes a plurality of gears, said rate of flow output signal being adapted to drive said gears, said gears having an output coupled to said register with said register having a readout in quantity units of flow through the line, means coupled to said pressure signal output for changing the gear ratio of said gears to alter the quantity readout in an inverse proportion to the pressure in the fluid line.

7. The device according to claim 1 including a remote meter, means for coupling said remote meter to said pressure output signal for providing an indication proportional to said fluid pressure at said remote meter.

8. In a water system having a plurality of water distribution conduits, a measuring device comprising: means for sensing the water system demand, means coupled to said sensing means to provide an output signal proportional to system demand, means for sensing the quantity of water flowing through a specified conduit for a given time period, means coupled to said latter sensing means to provide an output signal proportional to the quantity of flow through the specified conduit, and means for correlating said output signals to provide an indication proportional to the quantity of water utilized and the system demand.

9. The device according to claim 8 including a register, said indication being displayed on said register in quantity units.

10. The device according to claim 8 including a remote register, means for coupling said remote register to said device to provide a remote indication of system demand.

11. In a water system having a plurality of water distribution conduits, the method of determining user charges for water flowing through a users conduit as a function of system demand and quantity of water utilized comprising the steps of;

sensing the water system demand and providing an output signal proportional thereto;

sensing the quantity of water flowing through a users conduit for a given period of time and providing an output signal proportional thereto, correlating said output signals to provide an indication proportional to the quantity of water utilized and system demand; and calculating a charge to a water system user based on the net change in said latter indication for the given time period.

12. In fluid system having a plurality of fluid distribution conduits, a measuring device comprising: means for sensing the fluid system demand, means coupled to said sensing means to provide an output signal proportional to system demand, means for sensing the quantity of fluid flowing through a specified conduit for a given time period, means coupled to said latter sensing means to provide an output signal proportional to the quantity of flow through the specified conduit, and means for correlating said output signals to provide an indication proportional to the quantity of fluid utilized and the system demand.

13. The device according to claim 12 including a register, said indication being displayed on said register in quantity units.

14. The device according to claim 12 including a remote register, means for coupling said remote register to said device to provide a remote indication of system demand.

15. In a fluid system having a plurality of fluid distribution conduits, the method of determining user charges for fluid flowing through a users conduit as a function of system demand and quantity of fluid utilized comprising the steps of;
sensing the fluid system demand and providing an output signal proportional thereto;
sensing the quantity of fluid flowing through a users conduit for a given period of time and providing an output signal proportional thereto, correlating said output signals to provide an indication proportional to the quantity of fluid utilized and system demand; and calculating a charge to a fluid system user based on the net change in said latter indication for the given time period.

16. The device according to claim 12 wherein said demand sensing means includes means for sensing the pressure of the fluid and providing an output signal proportional to such pressure and means for correlating said output signals to provide an indication proportional to the quantity of fluid utilized and inversely proportional to the pressure of the fluid.

* * * * *